United States Patent
Parker

(10) Patent No.: US 11,052,959 B1
(45) Date of Patent: Jul. 6, 2021

(54) BATTERY-POWERED ENDLESS TRACK DRIVE MOTORCYCLE

(71) Applicant: Gregory Parker, St. Charles, MO (US)

(72) Inventor: Gregory Parker, St. Charles, MO (US)

(*) Notice: Subject to any disclaimer, the term of this patent is extended or adjusted under 35 U.S.C. 154(b) by 297 days.

(21) Appl. No.: 16/364,315

(22) Filed: Mar. 26, 2019

(51) Int. Cl.
*B62K 11/00* (2006.01)
*B62M 7/12* (2006.01)
*B62M 27/02* (2006.01)

(52) U.S. Cl.
CPC .............. *B62K 11/00* (2013.01); *B62M 7/12* (2013.01); *B62M 27/02* (2013.01); *B62K 2204/00* (2013.01); *B62M 2027/027* (2013.01)

(58) Field of Classification Search
CPC .... B62K 11/00; B62K 2204/00; B62M 27/02; B62M 7/12; B62M 2027/027
See application file for complete search history.

(56) References Cited

U.S. PATENT DOCUMENTS

| | | | |
|---|---|---|---|
| 3,568,786 A * | 3/1971 | Harsch | B62M 27/02 180/190 |
| 5,363,937 A | 11/1994 | James | |
| 6,604,590 B2 | 8/2003 | Foulk, Jr. | |
| 6,742,612 B2 * | 6/2004 | Campbell | B62M 27/02 180/53.4 |
| 7,182,165 B1 * | 2/2007 | Keinath | B62M 27/02 180/185 |
| 7,753,155 B2 | 7/2010 | Snyder | |
| 8,499,876 B2 | 8/2013 | Mercier | |
| 8,602,139 B2 | 12/2013 | Takamura | |
| 8,783,392 B2 | 7/2014 | Underwood | |
| 9,394,014 B2 * | 7/2016 | Girouard | B62D 55/08 |
| D778,783 S | 2/2017 | Riley | |
| 10,077,088 B1 * | 9/2018 | Forbes | B62K 13/00 |
| 2009/0101427 A1 * | 4/2009 | Baldwin | A63C 17/12 180/181 |
| 2010/0018787 A1 * | 1/2010 | Plazotta | B60L 50/60 180/65.6 |
| 2012/0103706 A1 * | 5/2012 | Kondo | B60K 1/00 |
| 2012/0104840 A1 * | 5/2012 | Zuchoski | B62D 55/088 305/100 |
| 2012/0222908 A1 * | 9/2012 | Mangum | B62M 27/02 180/193 |
| 2015/0251716 A1 * | 9/2015 | Matsuda | B62K 25/283 29/593 |
| 2016/0318580 A1 * | 11/2016 | Miyashiro | B62K 11/00 |
| 2017/0088013 A1 * | 3/2017 | Shimizu | B62M 7/04 |
| 2018/0229783 A1 * | 8/2018 | Marchildon | B62D 55/084 |

FOREIGN PATENT DOCUMENTS

WO 9408837 4/1994

* cited by examiner

*Primary Examiner* — Tony H Winner
*Assistant Examiner* — Marlon A Arce
(74) *Attorney, Agent, or Firm* — Kyle A. Fletcher, Esq.

(57) ABSTRACT

The battery-powered endless track drive motorcycle is a track cycle comprising a front track assembly, a rear track assembly, a battery, and a frame. The front and rear track assemblies use an endless track circulating around a driven sprocket, bogie sprockets, and idlers to distribute the weight of the vehicle and provide greater traction than a tire would provide. The track assemblies are driven by electric motors that receive electricity from the battery that mounted to the frame within a battery enclosure. A seat is mounted to the top of the frame. The front track assembly is steerable using handlebars and a suspension system pivotably mounted to the front of the frame.

12 Claims, 4 Drawing Sheets

US 11,052,959 B1

BATTERY-POWERED ENDLESS TRACK DRIVE MOTORCYCLE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of motorcycles and off-road vehicles, more specifically, a battery-powered endless track drive motorcycle.

SUMMARY OF INVENTION

The battery-powered endless track drive motorcycle is a track cycle comprising a front track assembly, a rear track assembly, a battery, and a frame. The front and rear track assemblies use an endless track circulating around a driven sprocket, bogie sprockets, and idlers to distribute the weight of the vehicle and provide greater traction than a tire would provide. The track assemblies are driven by electric motors that receive electricity from the battery that mounted to the frame within a battery enclosure. A seat is mounted to the top of the frame. The front track assembly is steerable using handlebars and a suspension system pivotably mounted to the front of the frame.

An object of the invention is to provide a vehicle suitable for use on off-road trails.

Another object of the invention is to provide front and rear endless track drives.

A further object of the invention is to power the endless track drive using electric motors.

Yet another object of the invention is to provide a battery within a battery enclosure on the frame to provide an electrical potential for operation of the electric motors.

These together with additional objects, features and advantages of the battery-powered endless track drive motorcycle will be readily apparent to those of ordinary skill in the art upon reading the following detailed description of the presently preferred, but nonetheless illustrative, embodiments when taken in conjunction with the accompanying drawings.

In this respect, before explaining the current embodiments of the battery-powered endless track drive motorcycle in detail, it is to be understood that the battery-powered endless track drive motorcycle is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the battery-powered endless track drive motorcycle.

It is therefore important that the claims be regarded as including such equivalent construction insofar as they do not depart from the spirit and scope of the battery-powered endless track drive motorcycle. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
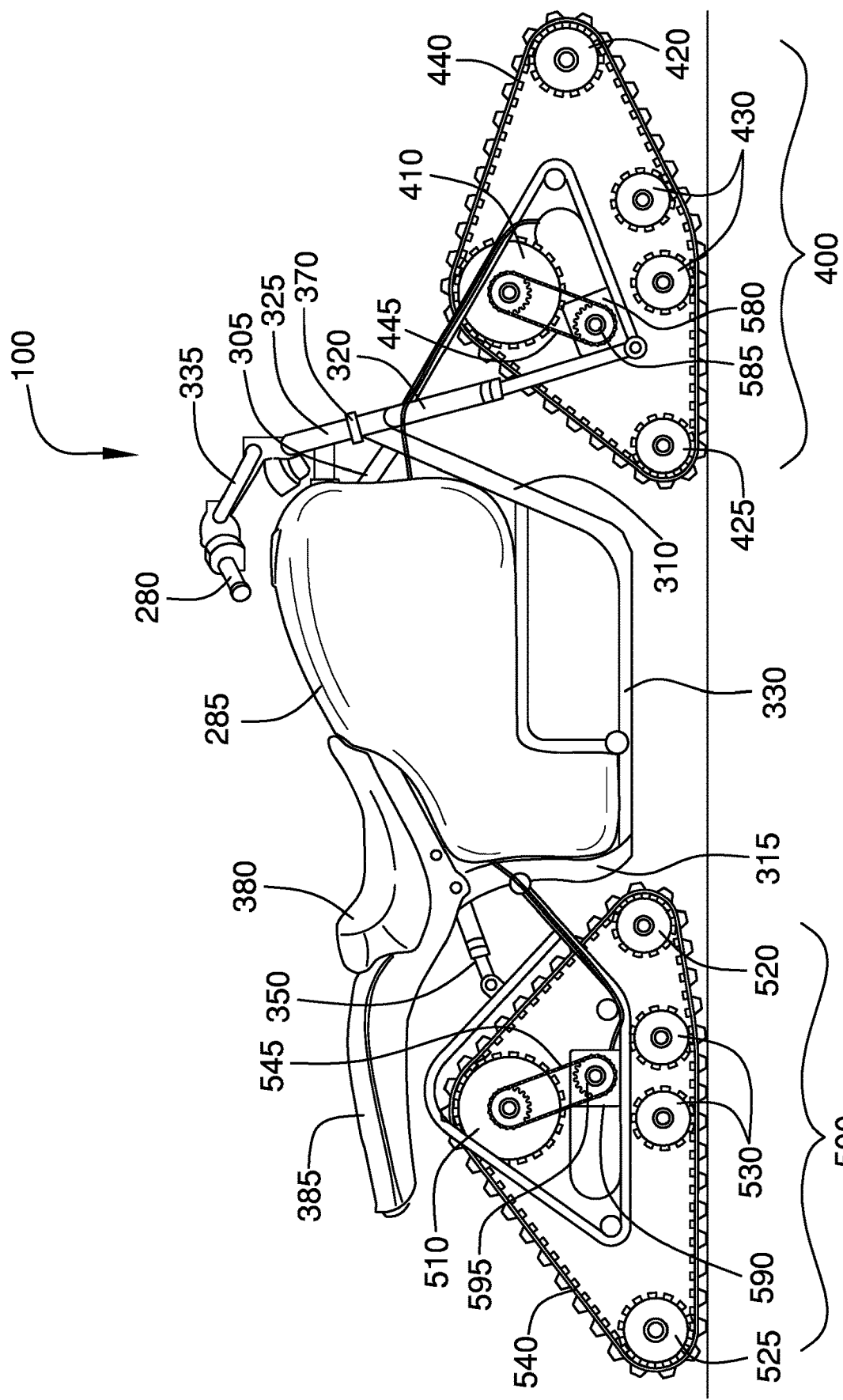
FIG. 1 is a side view of an embodiment of the disclosure.
Figure 2:
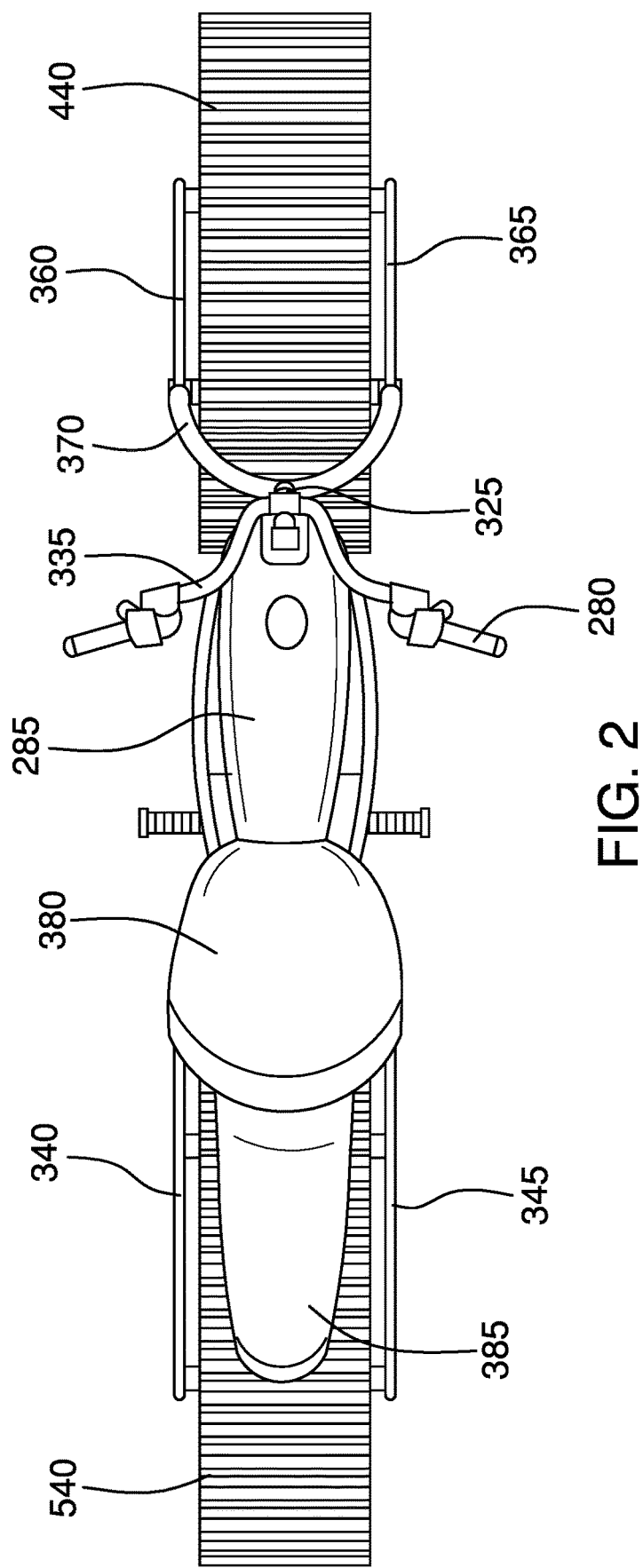
FIG. 2 is a top view of an embodiment of the disclosure.
Figure 4:
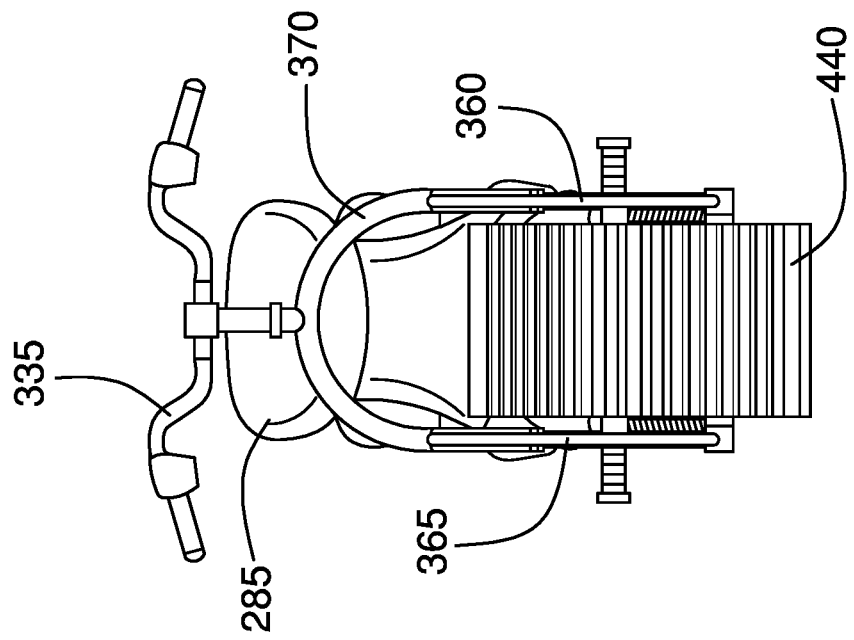
FIG. 4 is a front view of an embodiment of the disclosure.
Figure 3:
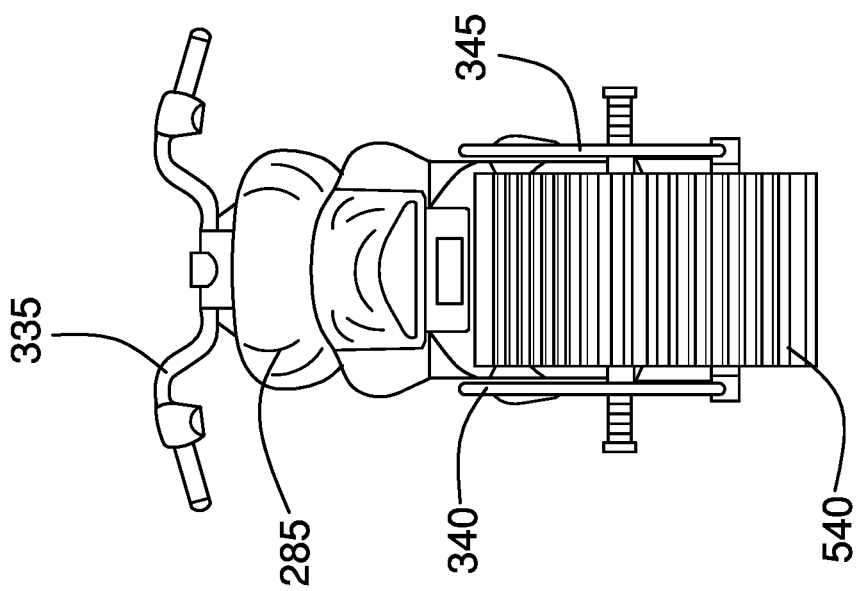
FIG. 3 is a rear view of an embodiment of the disclosure.
Figure 5:
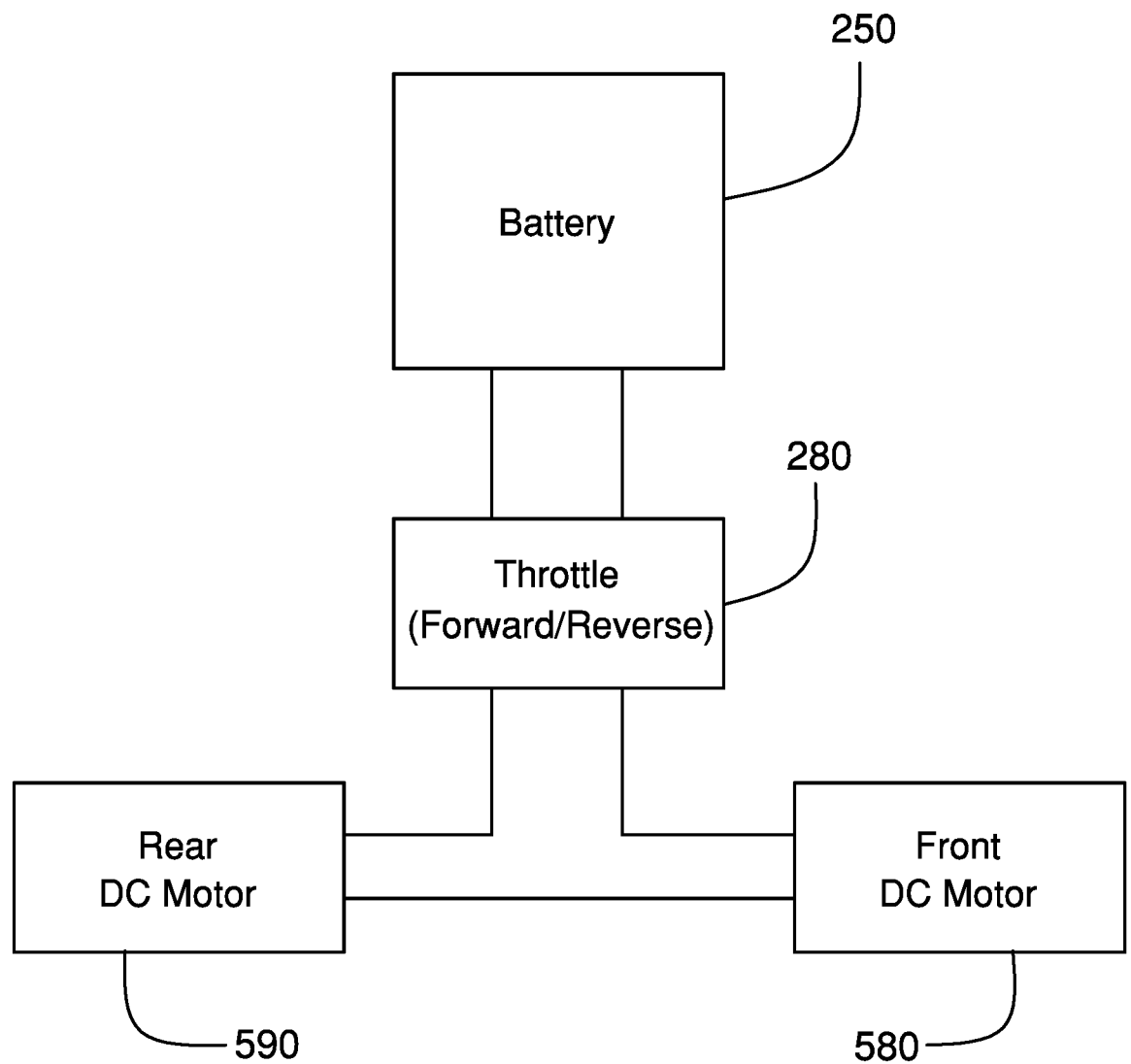
FIG. 5 is a block diagram of an embodiment of the disclosure illustrating the interconnection of the battery, the throttle, and the electric motors.

Detailed reference will now be made to a first potential embodiment of the disclosure, which is illustrated in FIGS. 1 through 5.

The battery-powered endless track drive motorcycle 100 (hereinafter invention) comprises a battery 250, a front track assembly 400, a rear track assembly 500, and a frame. The invention 100 is a track cycle powered by a pair of electric motors.

The battery 250 may be housed within a battery enclosure 285 that is mounted within a frame core. The battery may provide electricity that may be used to drive the pair of electric motors. The battery 250 may comprise one or more energy-storage devices. The battery 250 may be replaceable or rechargeable.

The front track assembly 400 propels the invention 100 by moving a front track 440 around the periphery of the front track assembly 400. The front track assembly 400 may be located at the front of the invention 100 between a left front track mount 360 and a right front track mount 365. The left front track mount 360 and the right front track mount 365 may couple to a front suspension bracket 370.

The front track 440 may be a continuous loop of flexible material surrounding the front track assembly 400. The shape of the front track 440 when viewed from a side may be triangular or trapezoidal. The bottom surface of the front track 440 may be in contact with the terrain. The front of the bottom surface of the front track 440 may be elevated above the terrain to allow the front track 440 to climb over obstacles. The outside surface of the front track 440 may be covered with a plurality of lateral ridges or other relief to increase traction with the terrain. The inside surface of the front track 440 may be covered with a repeating pattern of lateral ridges for engaging with a front driven sprocket 410, a first front bogie sprocket 420, and a second front bogie sprocket 425. The front track 440 may travel around a path defined by the front driven sprocket 410, the first front bogie sprocket 420, the second front bogie sprocket 425, and one or more front idler wheels 430. The front driven sprocket 410 may be a gear or sprocket driven by a front electric motor 580. The front driven sprocket 410 may be responsible for moving the front track 440. The first front bogie sprocket 420 and the second front bogie sprocket 425 may be bogie wheels or bogie sprockets which are not powered but which determine the size and shape of the front track 440. The first front bogie sprocket 420 and the second front bogie sprocket 425 may support the front track 440 at corners of the front track assembly 400 where the front track 440 changes direction of travel. A pattern of teeth on the outside circumference of the front driven sprocket 410, the first front bogie sprocket 420, and the second front bogie sprocket 425 may match the spacing and shape of the plurality of lateral ridges on the inside surface of the front track 440. The one or more front idler wheels 430 may be wheels or sprockets that are not powered but which guide the front track 440 and may increase tension on the front track 440.

The front electric motor 580 may cause rotation of a front motor drive gear 585 when the front electric motor 580 is activated. The front motor drive gear 585 may drive the front driven sprocket 410 via a front drive loop 445. The front electric motor 580, the front driven sprocket 410, the first front bogie sprocket 420, the second front bogie sprocket 425, and the one or more front idler wheels 430 may be directly or indirectly mounted on the left front track mount 360, the right front track mount 365, or both. The front electric motor 580 may be activated by a throttle 280. The rotational direction of the front electric motor 580 may be controlled by the polarity of the current flow through the front electric motor 580.

The rear track assembly 500 propels the invention 100 by moving a rear track 540 around the periphery of the rear track assembly 500. The rear track assembly 500 may be located at the rear of the invention 100 between a left rear track mount 340 and a right rear track mount 345. The front of the left rear track mount 340 and the front of the right rear track mount 345 may be pivotably coupled to one or more rear downtubes 315. The left rear track mount 340 and the right rear track mount 345 may further couple to the frame core via a rear suspension armature 350. The rear suspension armature 350 may comprise a rear shock absorber to dampen shocks while riding over non-level terrain.

The rear track 540 may be a continuous loop of flexible material surrounding the rear track assembly 500. The shape of the rear track 540 when viewed from a side may be triangular or trapezoidal. The bottom surface of the rear track 540 may be in contact with the terrain. The front of the bottom surface of the rear track 540 may be elevated above the terrain to allow the rear track 540 to climb over obstacles. The outside surface of the rear track 540 may be covered with a plurality of lateral ridges or other relief to increase traction with the terrain. The inside surface of the rear track 540 may be covered with a repeating pattern of lateral ridges for engaging with a rear driven sprocket 510, a first rear bogie sprocket 520, and a second rear bogie sprocket 525. The rear track 540 may travel around a path defined by the rear driven sprocket 510, the first rear bogie sprocket 520, the second rear bogie sprocket 525, and one or more rear idler wheels 530. The rear driven sprocket 510 may be a gear or sprocket driven by a rear electric motor 590. The rear driven sprocket 510 may be responsible for moving the rear track 540. The first rear bogie sprocket 520 and the second rear bogie sprocket 525 may be bogie wheels or bogie sprockets which are not powered but which determine the size and shape of the rear track 540. The first rear bogie sprocket 520 and the second rear bogie sprocket 525 may support the rear track 540 at corners of the rear track assembly 500 where the rear track 540 changes direction of travel. A pattern of teeth on the outside circumference of the rear driven sprocket 510, the first rear bogie sprocket 520, and the second rear bogie sprocket 525 may match the spacing and shape of the plurality of lateral ridges on the inside surface of the rear track 540. The one or more rear idler wheels 530 may be wheels or sprockets that are not powered but which guide the rear track 540 and may increase tension on the rear track 540.

The rear electric motor 590 may cause rotation of a rear motor drive gear 595 when the rear electric motor 590 is activated. The rear motor drive gear 595 may drive the rear driven sprocket 510 via a rear drive loop 545. The rear electric motor 590, the rear driven sprocket 510, the first rear bogie sprocket 520, the second rear bogie sprocket 525, and the one or more rear idler wheels 530 may be directly or indirectly mounted on the left rear track mount 340, the right rear track mount 345, or both. The rear electric motor 590 may be activated by the throttle 280. The rotational direction of the rear electric motor 590 may be controlled by the polarity of the current flow through the rear electric motor 590.

The frame comprises one or more backbone tubes 305, one or more front downtubes 310, the one or more rear downtubes 315, one or more bottom rails 330, a seat 380, the rear suspension armature 350, a neck 320, a steering pivot tube 325, a handle bars 335, and the front suspension bracket 370. The frame provides structure and support for the battery 250, the rear track assembly 500, the front track assembly 400. The frame provides seating for a rider and provides the ability to steer the invention 100.

The one or more backbone tubes 305, the one or more front downtubes 310, the one or more rear downtubes 315, and the one or more bottom rails 330 comprise the frame core. The one or more backbone tubes 305 may be the topmost tubes of the frame and may be oriented to run from front to rear. The seat 380 may be coupled to the top of the one or more backbone tubes 305. The one or more front downtubes 310 may be vertically oriented to run from top to bottom. The top of the one or more front downtubes 310 may couple to the front of the one or more backbone tubes 305. The one or more rear downtubes 315 may be vertically oriented to run from top to bottom. The top of the one or more rear downtubes 315 may couple to the rear of the one or more backbone tubes 305. The one or more bottom rails 330 may be the lowest tubes of the frame and may be oriented to run from front to rear. The front of the one or more bottom rails 330 may be coupled to the bottom of the one or more front downtubes 310. The rear of the one or more bottom rails 330 may be coupled to the bottom of the one or more rear downtubes 315. The seat 380 may be a padded surface on the top of the invention 100 adapted for the rider to sit upon.

The neck 320 may be a tube located at the front of the frame core. The neck 320 may be oriented vertically or may be inclined from lower front to upper rear. The steering pivot tube 325 may be an armature that passes through the neck 320 and pivots within the neck 320 for steering purposes. The handle bars 335 may be an armature that couples to the top of the steering pivot tube 325 and extends laterally from left to right. The handle bars 335 may be adapted for the rider to hold and steer with while riding. The throttle 280 may be coupled to the handle bars 335. The throttle 280 may control the rotational speed and direction of the front electric motor 580 and the rear electric motor 590. The front suspension bracket 370 may be one or more lateral armatures that are coupled to the bottom of the steering pivot tube 325. The left front track mount 360 and the right front track mount 365 may be coupled to the front suspension bracket 370. Rotating the handle bars 335 may cause the steering pivot tube 325 to pivot within the neck 320 and cause rotation on the front suspension bracket 370. Rotation of the front suspension bracket 370 may change the direction that the left front track mount 360 and the right front track mount 365 point, thus changing the direction of the front track assembly 400 and thereby changing direction of travel of the invention 100.

A rear fender 385 may be a protective surface used to deflect water and mud through into the air by the rear track assembly 500. The rear fender 385 may be coupled to the frame core and may be above the rear track assembly 500 and/or between the rear track assembly 500 and the seat 380.

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used herein, "bogie wheel" refers to an unpowered wheel that carries at least a portion of the weight of a vehicle. A bogie sprocket may be similar to a bogie wheel except for having a toothed circumference for the purpose of engaging with a track or chain.

As used herein, the words "couple", "couples", "coupled" or "coupling", refer to connecting, either directly or indirectly, and does not necessarily imply a mechanical connection.

As used in this disclosure, "DC" is an acronym for direct current.

As used in this disclosure, an "electric motor" is a device that converts electric energy into rotational mechanical energy.

As used in this disclosure, "flexible" refers to an object or material which will deform when a force is applied to it, which will not return to its original shape when the deforming force is removed, and which may not retain the deformed shape caused by the deforming force.

As used herein, "front" indicates the side of an object that is closest to a forward direction of travel under normal use of the object or the side or part of an object that normally presents itself to view or that is normally used first. "Rear" or "back' refers to the side that is opposite the front.

As used in this disclosure, a "gear" is a toothed wheel, cylinder, or other toothed mechanical element that is used to transmit motion, a change of speed, or a change of direction to second toothed wheel, cylinder, or other toothed mechanical element.

As used in this disclosure, a "handle" is an object by which a tool, object, or door is held or manipulated with the hand.

As used herein, "idler wheel" refers to an unpowered wheel that guides and/or tensions a belt or track. An idler sprocket may be similar to an idler wheel except for having a toothed circumference for engaging with a track or chain.

As used in this disclosure, an "internal combustion engine" is an engine powered by burning fuel within the engine.

As used in this disclosure, the word "lateral" refers to the sides of an object or movement towards a side. Lateral directions are generally perpendicular to longitudinal directions. "Laterally" refers to movement in a lateral direction.

As used in this disclosure, a "motor" refers to a device that transforms energy from an external power source into mechanical energy.

As used herein, the word "pivot" is intended to include any mechanical arrangement that allows for rotational motion. Non-limiting examples of pivots may include hinges, holes, posts, dowels, pins, points, rods, shafts, balls, and sockets, either individually or in combination.

As used in this disclosure, the term "shaft" is used to describe a rigid cylinder that is often used as the handle of a tool or implement or as the center of rotating machinery or motors. The definition of shaft explicitly includes solid shafts or shafts that comprise a hollow passage through the shaft along the center axis of the shaft cylinder, whether the shaft has one or more sealed ends or not.

As used herein, a "track drive" (also known as a continuous track, endless track, caterpillar track, or tank tread) refers to a vehicle propulsion system in which a continuous band of treads or track plates is driven by two or more wheels or sprockets. The band may be made from modular steel plates or from flexible material that may be reinforced with metal wires. As a non-limiting example, the band may be made from synthetic rubber reinforced with steel wires. The track drive may offer the advantages or spreading the weight of the vehicle over a larger surface area and providing improved traction on soft surfaces.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A battery-powered endless track drive motorcycle comprising:
    a battery, a front track assembly, a rear track assembly, and a frame;
    wherein the battery-powered endless track drive motorcycle is a track cycle powered by a pair of electric motors;
    wherein the rear track assembly propels the battery-powered endless track drive motorcycle by moving a rear track around a periphery of the rear track assembly;
    wherein the rear track assembly is located at a rear of the battery-powered endless track drive motorcycle between a left rear track mount and a right rear track mount;
    wherein a front of the left rear track mount and a front of the right rear track mount are pivotably coupled to one or more rear downtubes;
    wherein the left rear track mount and the right rear track mount couple to the frame core via a rear suspension armature;
    wherein the rear suspension armature comprises a rear shock absorber to dampen shocks while riding over non-level terrain.

2. The battery-powered endless track drive motorcycle according to claim 1
    wherein the battery is housed within a battery enclosure that is mounted within a frame core;
    wherein the battery provides electricity to drive the pair of electric motors;
    wherein the battery comprises one or more energy-storage devices;
    wherein the battery is replaceable or rechargeable.

3. The battery-powered endless track drive motorcycle according to claim 2
    wherein the front track assembly propels the battery-powered endless track drive motorcycle by moving a front track around the periphery of the front track assembly;
    wherein the front track assembly is located at the front of the battery-powered endless track drive motorcycle between a left front track mount and a right front track mount;
    wherein the left front track mount and the right front track mount couple to a front suspension bracket.

4. The battery-powered endless track drive motorcycle according to claim 3
    wherein the front track is a continuous loop of flexible material surrounding the front track assembly;
    wherein the shape of the front track when viewed from a side is triangular or trapezoidal;
    wherein the bottom surface of the front track is in contact with the terrain;
    wherein the front of the bottom surface of the front track is elevated above the terrain to allow the front track to climb over obstacles;
    wherein the outside surface of the front track is covered with a plurality of lateral ridges or other relief to increase traction with the terrain;
    wherein the inside surface of the front track is covered with a repeating pattern of lateral ridges for engaging with a front driven sprocket, a first front bogie sprocket, and a second front bogie sprocket.

5. The battery-powered endless track drive motorcycle according to claim 4
    wherein the front track travels around a path defined by the front driven sprocket, the first front bogie sprocket, the second front bogie sprocket, and one or more front idler wheels;
    wherein the front driven sprocket is a gear or sprocket driven by a front electric motor;
    wherein the front driven sprocket moves the front track;
    wherein the first front bogie sprocket and the second front bogie sprocket are bogie wheels or bogie sprockets which are not powered but which determine the size and shape of the front track;
    wherein the first front bogie sprocket and the second front bogie sprocket support the front track at corners of the front track assembly where the front track changes direction of travel;
    wherein a pattern of teeth on the outside circumference of the front driven sprocket, the first front bogie sprocket, and the second front bogie sprocket match the spacing and shape of the plurality of lateral ridges on the inside surface of the front track;
    wherein the one or more front idler wheels are wheels or sprockets that are not powered but which guide the front track and/or increase tension on the front track.

6. The battery-powered endless track drive motorcycle according to claim 5
    wherein the front electric motor causes rotation of a front motor drive gear when the front electric motor is activated;
    wherein the front motor drive gear drives the front driven sprocket via a front drive loop;
    wherein the front electric motor, the front driven sprocket, the first front bogie sprocket, the second front bogie sprocket, and the one or more front idler wheels are directly or indirectly mounted on the left front track mount, the right front track mount, or both;
    wherein the front electric motor is activated by a throttle;
    wherein the rotational direction of the front electric motor is controlled by the polarity of the current flow through the front electric motor.

7. The battery-powered endless track drive motorcycle according to claim 6
    wherein the rear track is a continuous loop of flexible material surrounding the rear track assembly;
    wherein the shape of the rear track when viewed from a side is triangular or trapezoidal;
    wherein the bottom surface of the rear track is in contact with the terrain;
    wherein the front of the bottom surface of the rear track is elevated above the terrain to allow the rear track to climb over obstacles;
    wherein the outside surface of the rear track is covered with a plurality of lateral ridges or other relief to increase traction with the terrain;
    wherein the inside surface of the rear track is covered with a repeating pattern of lateral ridges for engaging with a rear driven sprocket, a first rear bogie sprocket, and a second rear bogie sprocket.

8. The battery-powered endless track drive motorcycle according to claim 7
wherein the rear track travels around a path defined by the rear driven sprocket, the first rear bogie sprocket, the second rear bogie sprocket, and one or more rear idler wheels;
wherein the rear driven sprocket is a gear or sprocket driven by a rear electric motor;
wherein the rear driven sprocket moves the rear track;
wherein the first rear bogie sprocket and the second rear bogie sprocket are bogie wheels or bogie sprockets which are not powered but which determine the size and shape of the rear track;
wherein the first rear bogie sprocket and the second rear bogie sprocket support the rear track at corners of the rear track assembly where the rear track changes direction of travel;
wherein a pattern of teeth on the outside circumference of the rear driven sprocket, the first rear bogie sprocket, and the second rear bogie sprocket match the spacing and shape of the plurality of lateral ridges on the inside surface of the rear track;
wherein the one or more rear idler wheels are wheels or sprockets that are not powered but which guide the rear track and/or increase tension on the rear track.

9. The battery-powered endless track drive motorcycle according to claim 8
wherein the rear electric motor causes rotation of a rear motor drive gear when the rear electric motor is activated;
wherein the rear motor drive gear drives the rear driven sprocket via a rear drive loop;
wherein the rear electric motor, the rear driven sprocket, the first rear bogie sprocket, the second rear bogie sprocket, and the one or more rear idler wheels are directly or indirectly mounted on the left rear track mount, the right rear track mount, or both;
wherein the rear electric motor is activated by the throttle;
wherein the rotational direction of the rear electric motor is controlled by the polarity of the current flow through the rear electric motor.

10. The battery-powered endless track drive motorcycle according to claim 9
wherein the frame comprises one or more backbone tubes, one or more front downtubes, the one or more rear downtubes, one or more bottom rails, a seat, the rear suspension armature, a neck, a steering pivot tube, a handle bars, and the front suspension bracket;
wherein the frame provides structure and support for the battery, the rear track assembly, the front track assembly;
wherein the frame provides seating for a rider and provides the ability to steer the battery-powered endless track drive motorcycle.

11. The battery-powered endless track drive motorcycle according to claim 10
wherein the one or more backbone tubes, the one or more front downtubes, the one or more rear downtubes, and the one or more bottom rails comprise the frame core;
wherein the one or more backbone tubes are the topmost tubes of the frame and are oriented to run from front to rear;
wherein the seat is coupled to the top of the one or more backbone tubes;
wherein the one or more front downtubes are vertically oriented to run from top to bottom;
wherein the top of the one or more front downtubes couple to the front of the one or more backbone tubes;
wherein the one or more rear downtubes are vertically oriented to run from top to bottom;
wherein the top of the one or more rear downtubes couple to the rear of the one or more backbone tubes;
wherein the one or more bottom rails are the lowest tubes of the frame and are oriented to run from front to rear;
wherein the front of the one or more bottom rails are coupled to the bottom of the one or more front downtubes;
wherein the rear of the one or more bottom rails are coupled to the bottom of the one or more rear downtubes;
wherein the seat is a padded surface on the top of the battery-powered endless track drive motorcycle adapted for the rider to sit upon.

12. The battery-powered endless track drive motorcycle according to claim 11
wherein the neck is a tube located at the front of the frame core;
wherein the neck is oriented vertically or is inclined from lower front to upper rear;
wherein the steering pivot tube is an armature that passes through the neck and pivots within the neck for steering purposes;
wherein the handle bars are armatures that couple to the top of the steering pivot tube and extends laterally from left to right;
wherein the handle bars are adapted for the rider to hold and steer with while riding;
wherein the throttle is coupled to the handle bars;
wherein the throttle controls the rotational speed and direction of the front electric motor and the rear electric motor;
wherein the front suspension bracket is one or more lateral armatures that are coupled to the bottom of the steering pivot tube;
wherein the left front track mount and the right front track mount are coupled to the front suspension bracket;
wherein rotating the handle bars causes the steering pivot tube to pivot within the neck and cause rotation on the front suspension bracket;
wherein rotation of the front suspension bracket changes the direction that the left front track mount and the right front track mount point, thus changing the direction of the front track assembly and thereby changing direction of travel of the battery-powered endless track drive motorcycle.

* * * * *